United States Patent [19]

Kishihiro

[11] 4,300,840
[45] Nov. 17, 1981

[54] KNEADER FOR COMPOUNDED RESIN

[76] Inventor: Yamaoka Kishihiro, 1-33-104, Nakamiyakita-machi, Hirakata-Shi, Osaka 573, Japan

[21] Appl. No.: 187,851
[22] PCT Filed: Feb. 27, 1979
[86] PCT No.: PCT/JP79/00047
  § 371 Date: Nov. 23, 1979
  § 102(e) Date: Nov. 16, 1979
[87] PCT Pub. No.: WO79/00816
  PCT Pub. Date: Oct. 18, 1979

[30] Foreign Application Priority Data

Mar. 23, 1978 [JP] Japan ................... 53/33367

[51] Int. Cl.³ .............................................. B29B 1/06
[52] U.S. Cl. ........................................ 366/88; 366/89;
   366/90; 366/323; 366/149; 425/208
[58] Field of Search ........................ 366/79, 81, 82, 87,
   366/88, 89, 90, 323, 322, 324, 320, 319, 149;
   425/208, 207

[56] References Cited

U.S. PATENT DOCUMENTS

| | | | |
|---|---|---|---|
| 2,680,879 | 6/1954 | Schnuck | 366/88 |
| 3,687,423 | 8/1972 | Koch | 366/81 |
| 3,985,348 | 10/1976 | Skidmore | 366/81 |
| 4,075,712 | 2/1978 | Geyer | 366/79 |
| 4,092,015 | 5/1978 | Koch | 366/81 |
| 4,155,655 | 5/1979 | Chiselko | 366/89 |

*Primary Examiner*—Robert W. Jenkins
*Attorney, Agent, or Firm*—Jordan and Hamburg

[57] ABSTRACT

Apparatus for kneading compounded resinous material includes a cylinder within which there is sequentially arranged a preheating feed zone, a plasticizing kneading zone, a degassing zone and a measuring zone. A screw is rotatably positioned within the cylinder and extends through all of the afore-mentioned zones. The portion of the screw within the plasticizing kneading zone has a plurality of continuous helical flights each of which is given a front wall facing in the direction of screw rotation substantially perpendicular thereto. A rear portion of each flight defines a groove with the next adjacent flight such that the diameter of the screw between flights progressively decreases in the direction opposite to screw rotation. A plurality of axially extending recesses are formed on the interior surface of the cylinder which extend at least through the preheating feed zone and the plasticizing kneading zone. In the preferred forms of the invention, a die or injection nozzle for the material being processed is provided at the downstream end of the measuring zone of the cylinder.

14 Claims, 7 Drawing Figures

FIG. I.
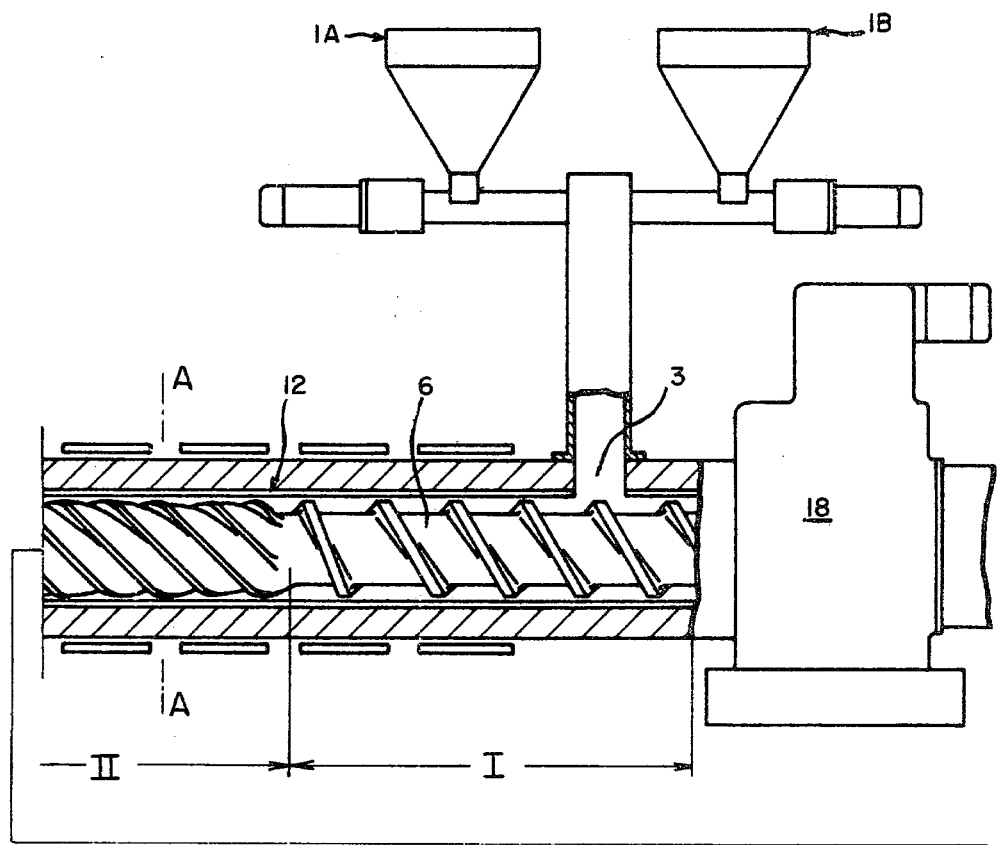
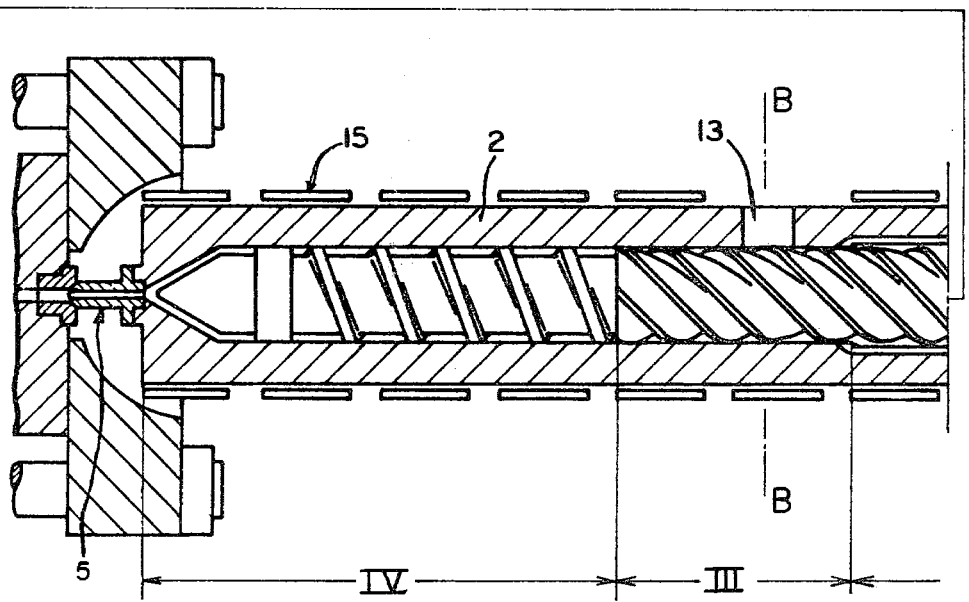

KNEADER FOR COMPOUNDED RESIN

TECHNICAL FIELD

This invention relates to improvements in a kneader for kneading compounded resins, and more particularly to a kneader having a kneading zone in which resin compositions can be completely kneaded by a single screw.

BACKGROUND ART

Compounded resins comprising a synthetic resin and a finely divided organic or inorganic material admixed therewith may be subjected to injection molding usually by preparing pellets with a kneader and then feeding the pellets to a separate injection molding machine for melting and injection molding therein to obtain a compounded resin product. Alternatively the materials may be kneaded and injection-molded by a continuous process with use of an injection molding machine having a small kneader attached to the feed inlet of the machine without prior pelletizing of the materials. However, such conventional methods have the following drawbacks. The former method involves the expenditures of of considerable heat energy and requires much labor since the resin is first melted in the kneader with application of heat, and, after cooling, is again heated and remelted for injection molding. On the other hand, the latter method which is adapted for a continuous process effects a savings in energy and labor but requires expensive apparatus. Because of this the former method has found wide use.

Extrusion molding machines have heretofore been proposed in which the shape of the screw is modified in various ways for the kneading operation to simplify the construction of the machine. Many of these proposals, however, are adapted to produce a shearing action only and are, therefore, unsatisfactory for kneading compounded resin compositions. Screws designed for compression in addition to shearing are complex in shape and difficult to make. They also have the drawback of permitting stagnation of the resin.

SUMMARY OF THE INVENTION

This invention overcomes these drawbacks and provides an extrusion molding machine or injection molding machine having a kneading zone for efficiently kneading resin compositions.

Pellets of compounded resin prepared by kneading can be satisfactorily injection-molded merely when melted and subjected to a shearing action, whereas synthetic resin can not be elaborately kneaded when compounded with finely divided organic or inorganic materials unless the materials are substantially kneaded by compression. shearing the cutting (folding) as in roll mills and Banbury mixers. According to this invention such a kneading operation can be efficiently performed by the cylinder and screw of an injection or extrusion molding machine of the in-line screw type.

According to the invention, a rotatable screw shaft disposed within a cylinder and provided with a preheating feed zone for preheating materials while advancing the materials. a kneading zone for plasticizing and kneading the materials, a degassing zone are arranged and a measuring zone in a continuous sequence. The kneading zone is adapted to shear, compress and cut or fold the materials. To perform such a complex action, the portion of the screw in the kneading zone is formed with a plurality of continuous helical flights. Each of the flights has a front wall facing in the direction of rotation of the screw substantially perpendicular thereto and a rear portion defining a groove between the flight and another flight so that the screw has a progressively decreasing diameter toward the direction opposite to the direction of rotation. The cylinder has a plurality of grooves extending continuously axially thereof at least through the preheating and kneading zones.

BRIEF DESCRIPTION OF THE DRAWINGS

FIG. 1 is a longitudinal view in central vertical cross section of an injection molding machine showing an embodiment of the invention;

BEST MODE OF CARRYING OUT THE INVENTION

Figure 2:
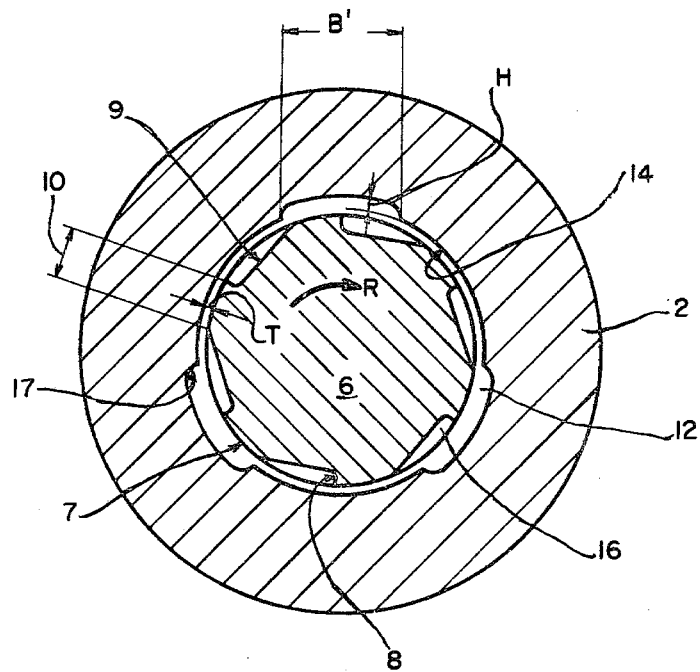
FIG. 2 is a cross-sectional view taken along the line A—A in FIG. 1.

Referring to the drawings, FIG. 1 shows an injection molding machine embodying the invention and having a cylinder 2, a feed inlet 3 and a screw 6. The inlet 3 has connected thereto measuring feed hoppers 1A and 1B for feeding different materials respectively. The cylinder has in its interior a preheating feed zone I, a plasticizing kneading zone II, a degassing zone III and a measuring zone IV arranged sequentially from the inlet side toward the forward end thereof. An injection nozzle 5 is connected to the forward end. Indicated at 18 is drive means for the screw 6, at 13 a gas outlet and at 15 a heater.

Figure 3:
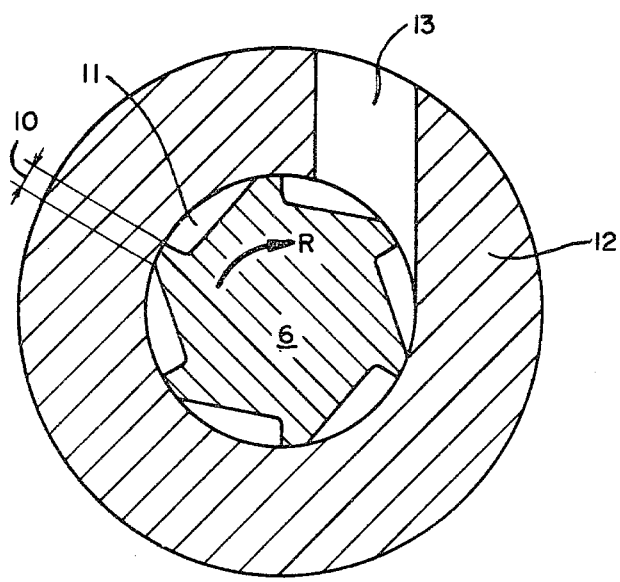
FIG. 3 is a cross-sectional view taken along the line B—B in FIG. 1.

In the plasticising kneading zone, the screw 6 is formed with six flights or kneading blades 7 as seen in FIG. 2. The kneading blades 7 extend helically continuously at an angle approximate to that conventionally used for the twist angle of the rotor blades of intensive mixers or Banbury mixers. Each of the kneading blades has a front wall 8 facing in the direction R of rotation of the screw substantially perpendicular thereto and a rear portion defining a groove 16 between the blade and another blade so that the diameter of the screw progressively decreases in the direction opposite to the direction of rotation. The inner surface 14 of the cylinder adjacent the screw is formed with a plurality of recesses or grooves 12 continuously extending axially thereof. The groove 12 continuously extend into the preheating feed zone I, in which zone the grooves assist in the transport of the materials. A front wall 17 defining the groove 12 and positioned toward the direction of rotation is substantially perpendicular to the direction of rotation in corresponding relation to the screw groove 16. Although the screw is similarly shaped in the plasticizing kneading zone II through the degassing zone III as seen in FIG. 3, the land 10 of the kneading blade at its forward end has a width progressively decreasing from the kneading zone II toward the degassing zone III so that the groove 11 in the degassing zone which constitutes an extension of groove 16 in the kneading zone is larger than groove 16. The grooves 12 in the cylinder do not extend into the degassing zone. The depth H and width B' are so determined that the materials can be compressed and cut due to the resulting flow thereof.

Figure 4:
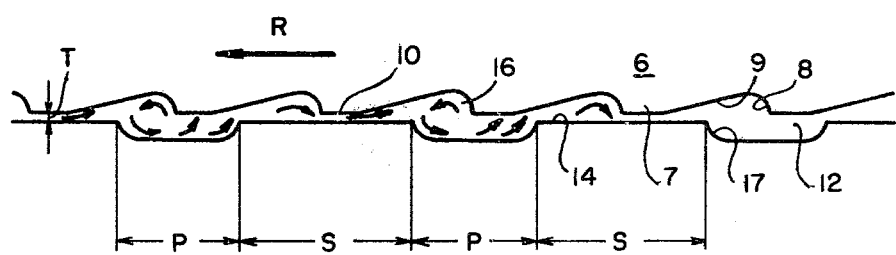
FIG. 4 is a schematic diagram showing the flow of material during kneading.

The operation of the apparatus will now be described. Resin is fed from the measuring feeder hopper 1A and a finely divided organic or inorganic material from the measuring feeder hopper 1B through the inlet 3 into the cylinder 2 which is maintained at a temperature needed for plasticizing the resin by the heater 15. The materials are fed in a specified ratio, preheated in the preheating zone I and are advanced to the kneading zone II by the rotation of the screw 6. In the kneading zone II, the groove 16 faces the wall portion 14 and the groove 12 of the cylinder alternately by virtue of the rotation of the screw 6, with the result that shearing S and compression P alternately take place along the direction of screw rotation as illustrated in FIG. 4. Thus, as the screw rotates from the position in which the screw groove 16 is opposed to the cylinder groove 12 as shown, the walls 8 and 17 positioned toward the direction of rotation come closer to each other and the space between the two grooved portions decreases. Materials are thus compressed and cut or folded due to the flow thereof caused by the compression, while part of the mixture is successively forced into the clearance between the land 10 of the blade and the cylinder wall portion 14 to be thereby subjected to a shearing action. Thus the materials are fully kneaded by being repeatedly compressed, cut and sheared. The mixture is subsequently degassed while passing through the degassing zone and is advanced to the measuring zone.

Figure 5:
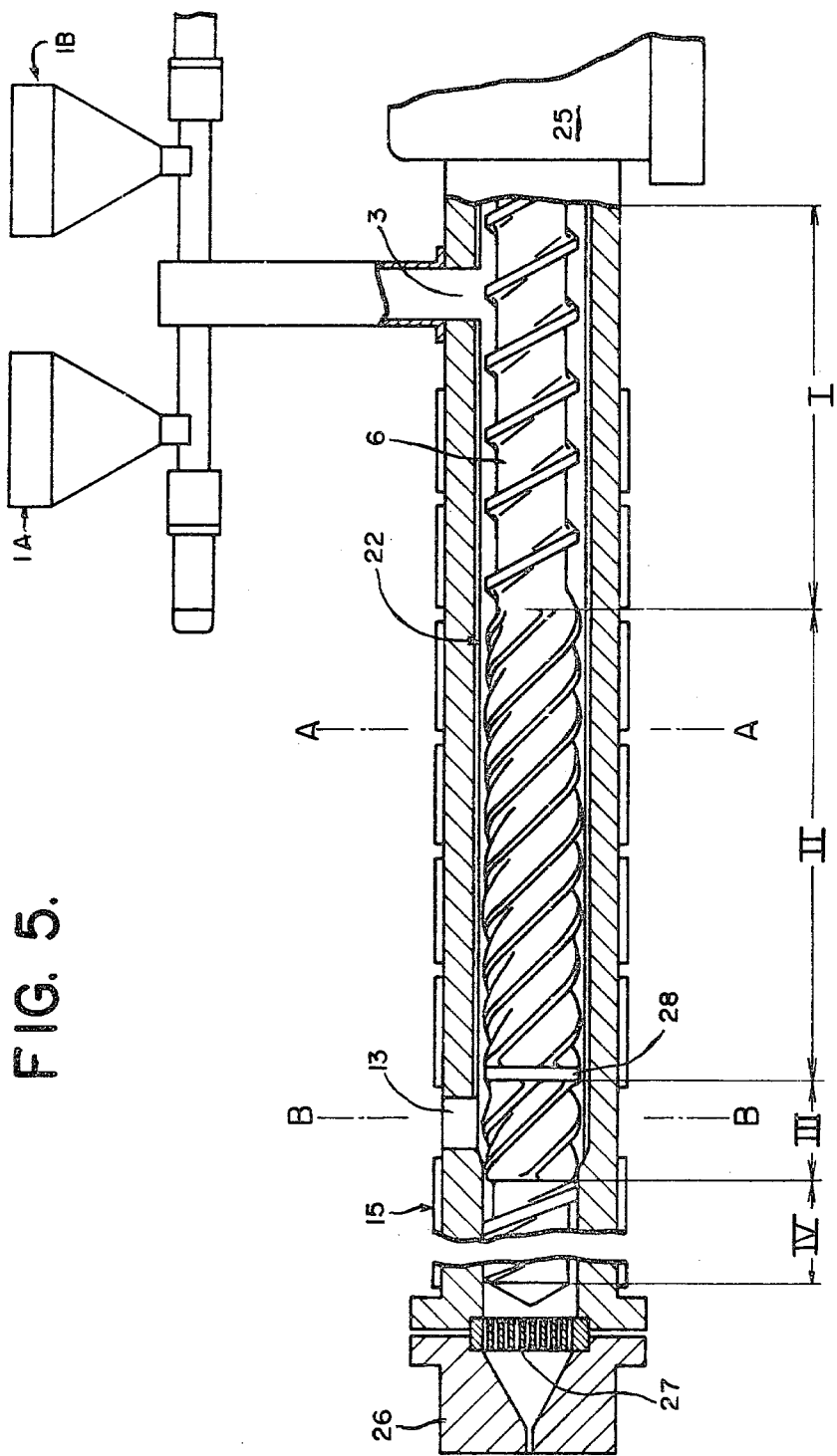
FIG. 5 is a longitudinal view in central vertical cross section of an extrusion molding machine showing another embodiment of the invention.
Figure 6:
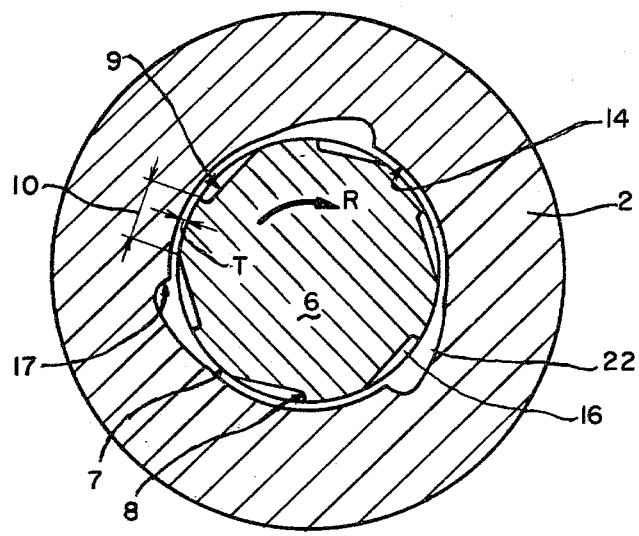
FIG. 6 is a cross-sectional view taken along the line A—A in FIG. 5.
Figure 7:
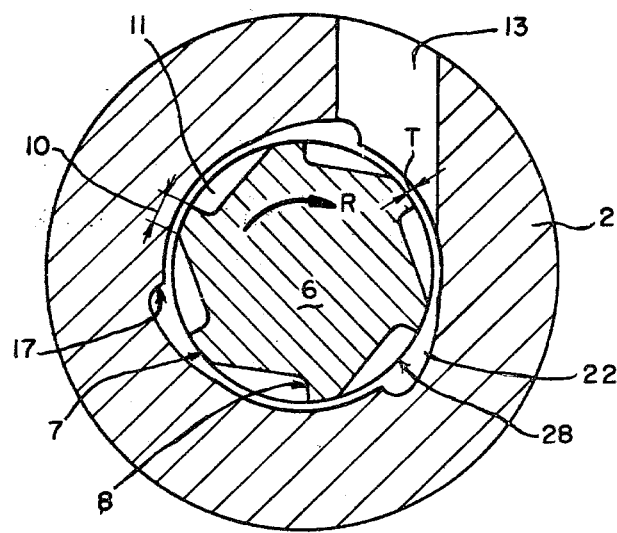
FIG. 7 is a cross-sectional view taken along the line B—B in FIG. 5.

FIGS. 5 to 7 show an extrusion molding machine embodying this invention and having basically the same construction as the foregoing embodiment. Indicated at 25 is drive means, at 26 a die, at 27 a breaker plate and at 28 a flow regulating ring provided at the terminal end of the kneading zone II for the screw. The cylinder has grooves 22 extending into the degassing zone III. The flow regulating ring 28 limits the feed of the materials at the position of the ring, giving an increased pressure to the kneading zone II to afford an enhanced kneading effect. The front wall 8 defining the screw groove and positioned substantially perpendicular to the direction of rotation serves to promote the feed of the materials, with the result that the pressure in the kneading zone increases toward the flow regulating ring 28. The materials can therefore be cut and folded efficiently. The grooves 22 of the cylinder have a depth which progressively increases in the direction of rotation of the screw as can be seen most clearly in FIGS. 6 and 7. While the materials tend to remain in the groove in the portion thereof located away from the direction of rotation, this configuration for the groove serves to prevent such stagnation.

The number of the screw flights and the number of grooves formed in the cylinder may be suitably determined in accordance with the diameter of the screw, etc. For example, when the screw has a diameter of 30 mm, three screw flights and three cylinder grooves may be formed. When the screw is 120 mm in diameter, 13 screw flights and 11 cylinder grooves may be provided. For screws of intermediate size, the numbers may be intermediate the above values. The amount of shearing action is adjustable by adjusting the clearance T between the land 10 of the screw and the inner wall 14 of the cylinder.

The invention described provides an injection or extrusion molding machine of the in-line type which is adapted to provide a kneading operation with a simplified construction. The machine has a kneading zone not only for producing a shearing action but also for compressing and cutting or folding the material. The kneader is thus useful for preparing compounded resins.

I claim:

1. Apparatus for kneading compounded resinous material comprising:
    a cylinder having a feed inlet communicating with one end thereof, the interior of said cylinder being subdivided sequentially from said inlet end into a preheating feed zone, a plasticizing kneading zone, a degassing zone and a measuring zone;
    a screw rotatably positioned within said cylinder and extending through said zones, the portion of said screw within said plasticizing kneading zone comprising a plurality of continuous helical flights, each of said flights having a front wall facing in the direction of screw rotation substantially perpendicular thereto and a rear portion defining a groove with the next adjacent flight such that the diameter of the screw between flights progressively decreases in the direction opposite to screw rotation; and
    a plurality of axially extending recesses formed along the interior surface of said cylinder and disposed parallel to the axis of said cylinder, said axially extending recesses extending at least through said preheating feed zone and plasticizing kneading zone.

2. Apparatus according to claim 1, wherein the walls of the grooves between said flights and the walls of the recesses in said cylinder are so dimensioned and configured to produce successive compression and shearing of the material being processed.

3. Apparatus according to claim 1, wherein said grooves formed between the flights of the screw have a depth which progressively increases in the direction of material flow through the apparatus.

4. Apparatus according to claim 1, wherein the lands of the screw flights in said plasticizing kneading zone and in said degassing zone have a width which progressively decreases in the direction of material flow through the apparatus.

5. Apparatus according to claim 1, wherein a flow regulating ring is provided at the downstream end of said plasticizing kneading zone for restriction of the flow path of the material being processed to thereby increase the pressure on such material within the plasticizing kneading zone.

6. Apparatus according to claim 1, wherein an injection nozzle for the material leaving said measuring zone is provided.

7. Apparatus according to claim 1, wherein a die for the material leaving said measuring zone is provided.

8. Apparatus according to claim 1 wherein said axially extending recess has a constant cross sectional configuration along its axial length.

9. Apparatus according to claim 1 wherein said axially extending recess has a configuration such that an imaginary bisecting plane containing the axis of said cylinder bisects said recess into two equal segments.

10. Apparatus according to claim 1 wherein said axially extending recess has a configuration such that an imaginary plane containing the axis of said cylinder and passing through the annular midpoint of said recess divides said recess into two unequal segments.

11. Apparatus according to claim 10 wherein the segment disposed in the direction of rotation of said screw is larger than the other segment disposed opposite the direction of rotation of the screw.

12. Apparatus according to claim 1 wherein said axial recess has a substantially constant depth.

13. Apparatus according to claim 1 wherein said axial recess has a generally increasing depth in the direction of rotation of said screw considered in a plane perpendicular to the axis of said cylinder.

14. An injection molding machine comprising:
 a cylinder having a feed inlet communicating with one end thereof, the interior of said cylinder being subdivided sequentially from said inlet end into a preheating feed zone, a plasticizing kneading zone, a degassing zone and a measuring zone;
 a screw rotatably positioned within said cylinder and extending through said zones, the portion of said screw within said plasticizing kneading zone comprising a plurality of continuous helical flights, each of said flights having a front wall facing in the direction of screw rotation substantially perpendicular thereto and a rear portion defining a groove with the next adjacent flight such that the diameter of the screw between flights progressively decreases in the direction opposite to screw rotation; and
 a plurality of axially extending recesses formed along the interior surface of said cylinder and disposed parallel to the axis of said cylinder, said axially extending recesses extending at least through said plasticizing kneading zone.

* * * * *